US012798929B2

(12) United States Patent
Ma et al.

(10) Patent No.: US 12,798,929 B2
(45) Date of Patent: Nov. 17, 2026

(54) ADAPTIVE CONTROL METHOD AND SYSTEM FOR OFFSHORE CRANES WITHOUT REQUIRING VELOCITY FEEDBACK

(71) Applicant: Shandong University, Jinan (CN)

(72) Inventors: Xin Ma, Jinan (CN); Ling Yang, Jinan (CN); Yibin Li, Jinan (CN)

(73) Assignee: Shandong University, Jinan City (CN)

( * ) Notice: Subject to any disclaimer, the term of this patent is extended or adjusted under 35 U.S.C. 154(b) by 0 days.

(21) Appl. No.: 19/344,643

(22) Filed: Sep. 30, 2025

(65) Prior Publication Data

US 2026/0042644 A1 Feb. 12, 2026

(30) Foreign Application Priority Data

Oct. 10, 2024 (CN) ......................... 202411410406.7

(51) Int. Cl.
*B66C 13/48* (2006.01)

(52) U.S. Cl.
CPC .................................... *B66C 13/48* (2013.01)

(58) Field of Classification Search
CPC ...................................................... B66C 13/48
USPC ............................................................ 701/21
See application file for complete search history.

(56) References Cited

U.S. PATENT DOCUMENTS

2012/0027525 A1* 2/2012 Vandenbulcke ...... E02B 17/021 405/196
2025/0282584 A1* 9/2025 Zhang ..................... B66C 13/46

FOREIGN PATENT DOCUMENTS

| | | | |
|---|---|---|---|
| CN | 110937510 | A | 3/2020 |
| CN | 114326432 | A | 4/2022 |
| CN | 118092186 | A | 5/2024 |
| KR | 20040057720 | A | 7/2004 |

OTHER PUBLICATIONS

Lanhua Shen et al., "Research on Key Technology of Tower Crane Gantry Construction", Construction Mechanization, No. 3, Mar. 15, 2020, pp. 15-17.
Qingxiang Wu et al., "Simulation and Experimental Research of the Feedforward Anti-sway Control Algorithm for Overhead Cranes", Journal of Wuhan University of Technology, vol. 38, No. 6, Jun. 30, 2016, pp. 109-116.

* cited by examiner

*Primary Examiner* — Andrew Joseph Rudy

(57) ABSTRACT

An adaptive control method for offshore cranes without requiring velocity feedback, in which parameters of an offshore crane system are obtained, and a three-dimensional dynamic model of an offshore crane system is constructed based on ship's roll and pitch motions; a total energy function is constructed based on the three-dimensional dynamic model, and an energy change is described according to a change rate of a total energy of the offshore crane system; based on the three-dimensional dynamic model, auxiliary variables are constructed to replace a velocity signal of a state variable in a controller; based on an inverse trigonometric saturation function and the auxiliary variables, an adaptive controller without requiring velocity feedback is constructed; and the offshore crane system is controlled based on the adaptive controller for control to realize positioning and sway suppression. An adaptive control system is also provided.

9 Claims, 4 Drawing Sheets

ADAPTIVE CONTROL METHOD AND SYSTEM FOR OFFSHORE CRANES WITHOUT REQUIRING VELOCITY FEEDBACK

CROSS-REFERENCE TO RELATED APPLICATIONS

This application claims the benefit of priority from Chinese Patent Application No. 202411410406.7, filed on Oct. 10, 2024. The content of the aforementioned application, including any intervening amendments thereto, is incorporated herein by reference in its entirety.

TECHNICAL FIELD

This application relates to sway suppression motion control for bridge cranes, and more particularly to an adaptive control method and system for offshore cranes without requiring velocity feedback.

BACKGROUND

Described herein is only the technical background related to the present disclosure, which does not necessarily constitute the prior art.

Offshore cranes have been widely used in the maritime transportation due to their excellent flexibility and practicality. However, the frequency occurrence of complex external disturbances, such as irregular waves and constantly-changing winds, will inevitably reduce the control efficiency of cranes. In addition, the complex nonlinear characteristics of the offshore cranes further complicate the design of control systems.

Under the action of waves, the offshore cranes will be subjected to 6-degree-of-freedom (6-DOF) motion including roll, pitch, and yaw, and at this time, the offshore cranes operate under a non-inertial coordinate system. In practice, it is often feasible to simultaneously control the lifting and rotation motions of the boom to enhance transportation efficiency of the offshore cranes. However, the three-dimensional spatial motion of the boom is susceptible to ocean waves, rendering the design of its control system extremely difficult. In addition, a cable length between a hook and a payload cannot be neglected in the practical operation, and a significant mass difference exists therebetween, resulting in obvious double-pendulum dynamics. Consequently, it is extremely difficult to achieve the payload positioning and sway suppression control. Over the past decade, extensive researches have been conducted on the design of control systems for offshore cranes. However, these studies mainly focus on the design of two-dimensional control systems, that is, only considering the control of the lifting motion of the boom, which inevitably restricts the application of corresponding controllers. The offshore cranes are constantly subjected to complex ship motion triggered by waves. The existing studies often only consider the roll, and when modeling cranes, the payload and hook are equivalent to a mass point, such that the double-pendulum dynamics of the hook and the payload are ignored. In addition, most of the existing controllers require the precise state variable (e.g., velocity) as feedback signals. However, it often fails to directly measure the speed in the practical application, and the noise in the velocity signals will also be amplified by ordinary numerical differentiators, which will further affect the stability and safety of the control systems.

SUMMARY

In order to solve the above problems, this application provides an adaptive control method and system for offshore cranes without requiring velocity feedback, in which an offshore crane model and a corresponding adaptive controller are constructed to realize the positioning and sway suppression of the boom payload.

In a first aspect, this application provides an adaptive control method for offshore cranes without requiring velocity feedback, comprising:

- obtaining parameters of an offshore crane system, and constructing a three-dimensional dynamic model of the offshore crane system considering roll and pitch motions of a ship;
- constructing a total energy function based on the three-dimensional dynamic model of the offshore crane system, and describing an energy change according to a rate of change of a total energy of the offshore crane system;
- based on the three-dimensional dynamic model of the offshore crane system, constructing auxiliary variables to replace a velocity signal of a state variable in a controller;
- based on an inverse trigonometric saturation function and the auxiliary variables, constructing an adaptive controller without requiring velocity feedback;
- controlling the offshore crane system based on the adaptive controller to realize positioning and sway suppression of the offshore crane system.

In an embodiment, the three-dimensional dynamic model of the offshore crane system is constructed based on a Lagrange modeling equation in combination with wind resistance and wave disturbances existing in practical applications, expressed as:

$$M(\zeta)\ddot{\zeta}+C(\zeta,\dot{\zeta})\dot{\zeta}+G(\zeta)=U-F;$$

wherein $M(\zeta)$ represents a mass matrix; $C(\zeta, \dot{\zeta})$ represents a centripetal-Coriolis matrix; $G(\zeta)$ represents a gravity vector; U represents an input vector; F represents a wind resistance and friction vector; $\zeta$ represents the state variable; $\dot{\zeta}$ represents a velocity term of the state variable; and $\ddot{\zeta}$ represents an acceleration term of the state variable.

In an embodiment, the step of constructing the total energy function based on the three-dimensional dynamic model of the offshore crane system, and describing the energy change according to the rate of change of the total energy of the offshore crane system comprises:

- considering that the total energy of the offshore crane system comprises kinetic and potential energies, based on the three-dimensional dynamic model of the offshore crane system, constructing the total energy function involving the kinetic and potential energies; and
- differentiating the total energy function to obtain the rate of change of the total energy; and
- analyzing the rate of change of the total energy to describe the energy change of the offshore crane system;
- wherein the total energy of the offshore crane during a control process, and as long as the total energy of the offshore crane system maintains stable, it indicates that the offshore crane system is stable.

In an embodiment, the total energy function is expressed as:

$$E = \frac{1}{2}\dot{\zeta}^T M(\zeta)\dot{\zeta} + (m_1 + m_2)l_1 g\left(1 - \cos\sqrt{\zeta_1^2 + \zeta_2^2}\right) + m_2 l_2 g\left(1 - \cos\sqrt{\zeta_3^2 + \zeta_4^2}\right);$$

wherein $M(\zeta)$ represents a mass matrix; $\zeta$ represents the state variable; $\dot{\zeta}$ represents a velocity term of the state variable; $\ddot{\zeta}$ represents an acceleration term of the state variable; $m_1$ represents a weight of a hook; $m_2$ represents a weight of a payload; $l_1$ represents a length of a hoisting rope; $l_2$ represents a distance between the hook and the payload; g represents a gravitational acceleration; $\zeta_1$, $\zeta_2$, $\zeta_3$ and $\zeta_4$ are swing angles of the hook and the payload; and T represents transpose.

In an embodiment, the auxiliary variables are expressed as:

$$\dot{\varsigma}_5 = -k_{d5}(\varsigma_5 + k_{d5}e_5); \text{ and}$$

$$\dot{\varsigma}_6 = -k_{d6}(\varsigma_6 + k_{d6}e_6);$$

wherein $e_5=\zeta_5-\zeta_{5d}$; $e_6=\zeta_6-\zeta_{6d}$; $\zeta_{5d}$ represents a target lifting angle of a boom in an inertial coordinate system; $\zeta_{6d}$ represents a target rotation angle of the boom; $\zeta_5$ represents the actual lifting angle of the boom; $\zeta_6$ represents the actual rotation angle of the boom; $k_{d5}$ and $k_{d6}$ are positive gain parameters; $\varsigma_5$ and $\varsigma_6$ are the position values of the auxiliary variables; and $\dot{\varsigma}_5$ and $\dot{\varsigma}_6$ are velocity values of the auxiliary variables.

In embodiment, based on the inverse trigonometric saturation function and the auxiliary variables, the adaptive controller without requiring velocity feedback is constructed, expressed as:

$$\tau_5 = -k_{p5}\arctan(e_5) - k_{d5}\arctan(\varsigma_5 + k_{d5}e_5) + \delta_1^T\hat{p}_1; \text{ and}$$

$$\tau_6 = -k_{p6}\arctan(e_6) - k_{d6}\arctan(\varsigma_6 + k_{d6}e_6) + \delta_2^T\hat{p}_2;$$

wherein $e_5=\zeta_5-\zeta_{5d}$; $e_6=\zeta_6-\zeta_{6d}$; $\zeta_{5d}$ represents the target lifting angle of the boom in the inertial coordinate system; $\zeta_{6d}$ represents the target rotation angle of the boom; $\zeta_5$ represents the actual lifting angle of the boom; $\zeta_6$ represents the actual rotation angle of the boom; $k_{p5}$ and $k_{p6}$ are error-dependent control coefficients; $k_{d5}$ and $k_{d6}$ are error-derivative-dependent control coefficients;

$$\dot{\hat{p}}_1^T = \dot{e}_5\delta_1^T H_1^{-1};$$

$$\dot{\hat{p}}_2^T = \dot{e}_6\delta_2^T H_2^{-1};$$

$H_1$ and $H_2$ are positive diagonal matrices;

$$\delta_1^T = [S_5 \quad C_5];$$

$$\delta_2^T = [S_6 \quad C_6];$$

$S_5$ represents sin $\zeta_5$; $S_6$ represents sin $\zeta_6$; $C_5$ represents cos $\zeta_5$; and $C_6$ represents cos $\zeta_6$; $\varsigma_5$ and $\varsigma_6$ are the position values of the auxiliary variables; $\tau_5$ represents a torque for driving a lifting motion of the boom; and $\tau_6$ represents a torque for driving a rotation motion of the boom.

In an embodiment, a control expression of the adaptive controller comprises a torque expression of a lifting motor of the boom and a torque expression of a rotation motor of the boom; and the step of controlling the offshore crane system based on the adaptive controller to realize positioning and sway suppression of the offshore crane system comprises:

controlling the lifting motor in a torque control mode to realize positioning and sway suppression of the offshore crane system.

In a second aspect, this application provides an adaptive control system for offshore cranes without requiring velocity feedback, comprising:

a model construction module;

an energy analysis module;

an auxiliary variable construction module;

a controller design module; and an adaptive control module;

wherein the model construction module is configured to obtain the parameters of the offshore crane system, and construct the three-dimensional dynamic model of the offshore crane system considering roll and pitch motions of the ship;

the energy analysis module is configured to construct the total energy function based on the three-dimensional dynamic model of the offshore crane system, and describe the energy change according to the rate of change of the total energy of the offshore crane system;

the auxiliary variable construction module is configured to construct the auxiliary variables to replace the velocity signals of the state variables in the controller in combination with the three-dimensional dynamic model of the offshore crane system;

the controller design module is configured to construct the adaptive controller without requiring velocity feedback based on the inverse trigonometric saturation function and the auxiliary variables; and the adaptive control module is configured to control the offshore crane system based on the adaptive controller to realize positioning and sway suppression of the offshore crane system.

In a third aspect, this application provides a computer-readable storage medium; wherein the computer-readable storage medium is configured to store a computer program; and the computer program is configured to be executed by a processor to implement the adaptive control method in the first aspect.

In a fourth aspect, this application provides a computer device, comprising a memory, a processor and a computer program stored in the memory and configured to be executed on the processor; wherein the processor is configured to execute the computer program to perform the adaptive control method in the first aspect.

Compared to the prior art, the present disclosure has the following beneficial effects.

The present disclosure provides the adaptive control method and system for offshore cranes without requiring velocity feedback, constructs a three-dimensional offshore crane model considering roll and pitch motions of the ship, and designs the adaptive control method in view of the three-dimensional dynamic model. First, the present disclosure utilizes the Lagrange modeling equation to construct the offshore crane model, and constructs a Lyapunov energy function involving the kinetic and potential energy. Then, the present disclosure derives a basis form of the adaptive controller based on a first derivative of the energy function, and replaces the velocity information of the adaptive controller with designed auxiliary variables. Such designed controller can perform positioning of the boom and the payload, and has good sway suppression of the payload.

BRIEF DESCRIPTION OF THE DRAWINGS

The accompanying drawings of this application are provided for further understanding. The embodiments and description are illustrative and are not intended to limit the disclosure.

DETAILED DESCRIPTION OF EMBODIMENTS

The present disclosure will be further described below with reference to the accompanying drawings and the specific embodiments.

It should be noted that the detailed descriptions blow are illustrative to provide further understanding on the present disclosure. Unless otherwise defined, technical and scientific terms used herein have the same meaning as commonly understood by those of ordinary skill in the art.

It should be noted that the terms used herein are only for illustrating specific embodiments, rather than limiting the disclosure. Unless otherwise defined, the terms used herein in a singular form are also intended to include a plural form. In addition, it should be noted that the term “and/or” used herein includes three solutions, for example, “A” and/or “B” includes solution “A”, solution “B”, and a combination thereof.

Embodiments and features in the embodiments of the present disclosure can be combined without conflicts.

Embodiment 1

In view of the present problems that few control strategies for marine systems and few attentions on control of actual offshore cranes, the present disclosure provides the following technical solutions. The present disclosure utilizes a Lagrange modeling equation to construct an offshore crane model, and constructs a Lyapunov energy function involving the kinetic and potential energy. Then, the present disclosure derives a basis form of the adaptive controller based on a first derivative of the energy function, and replaces a velocity information of an adaptive controller with designed auxiliary variables. Such designed controller can perform positioning of a boom and a payload, and has good sway suppression of the payload. The present disclosure will be specifically described below.

Figure 1:
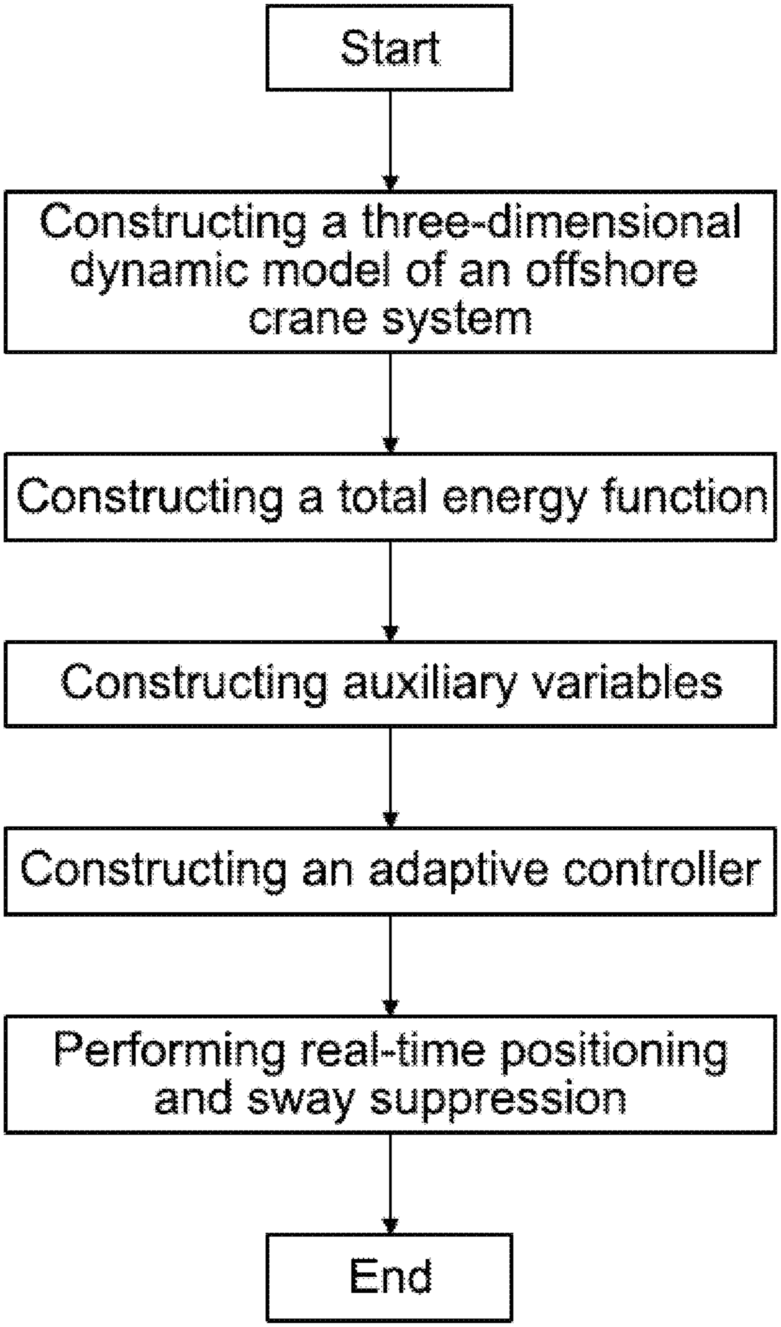
FIG. 1 is a flow chart of an adaptive control method for offshore cranes without requiring velocity feedback according to Embodiment 1 of the present disclosure.
Figure 2:
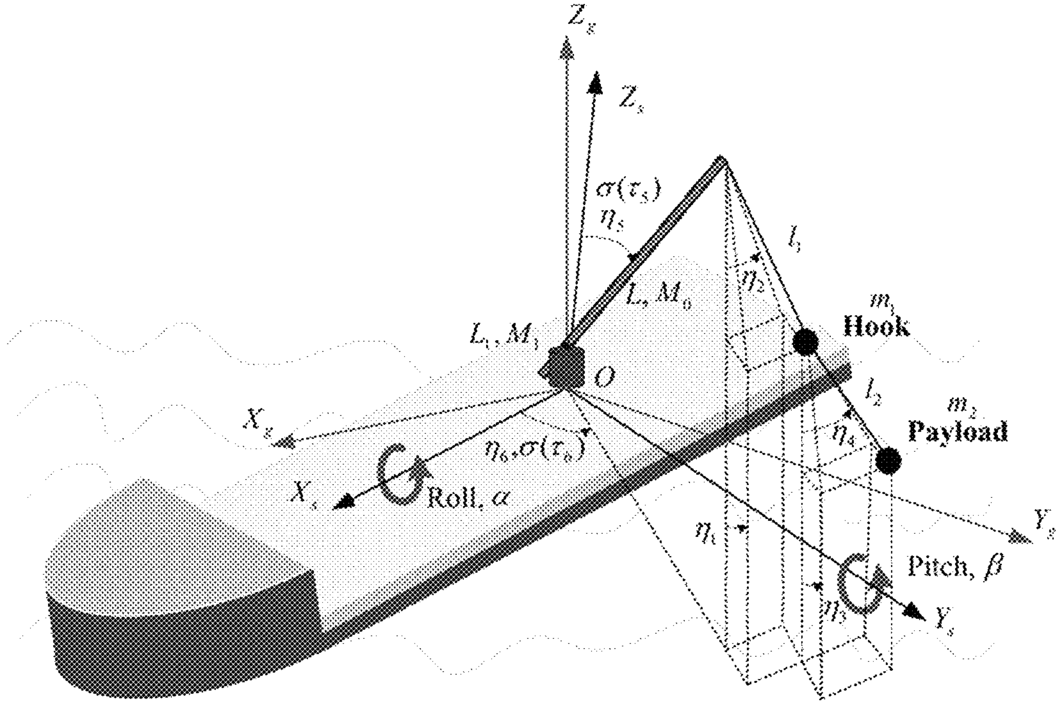
FIG. 2 is a structural diagram of an offshore crane according to Embodiment 1 of the present disclosure.
Figure 3:
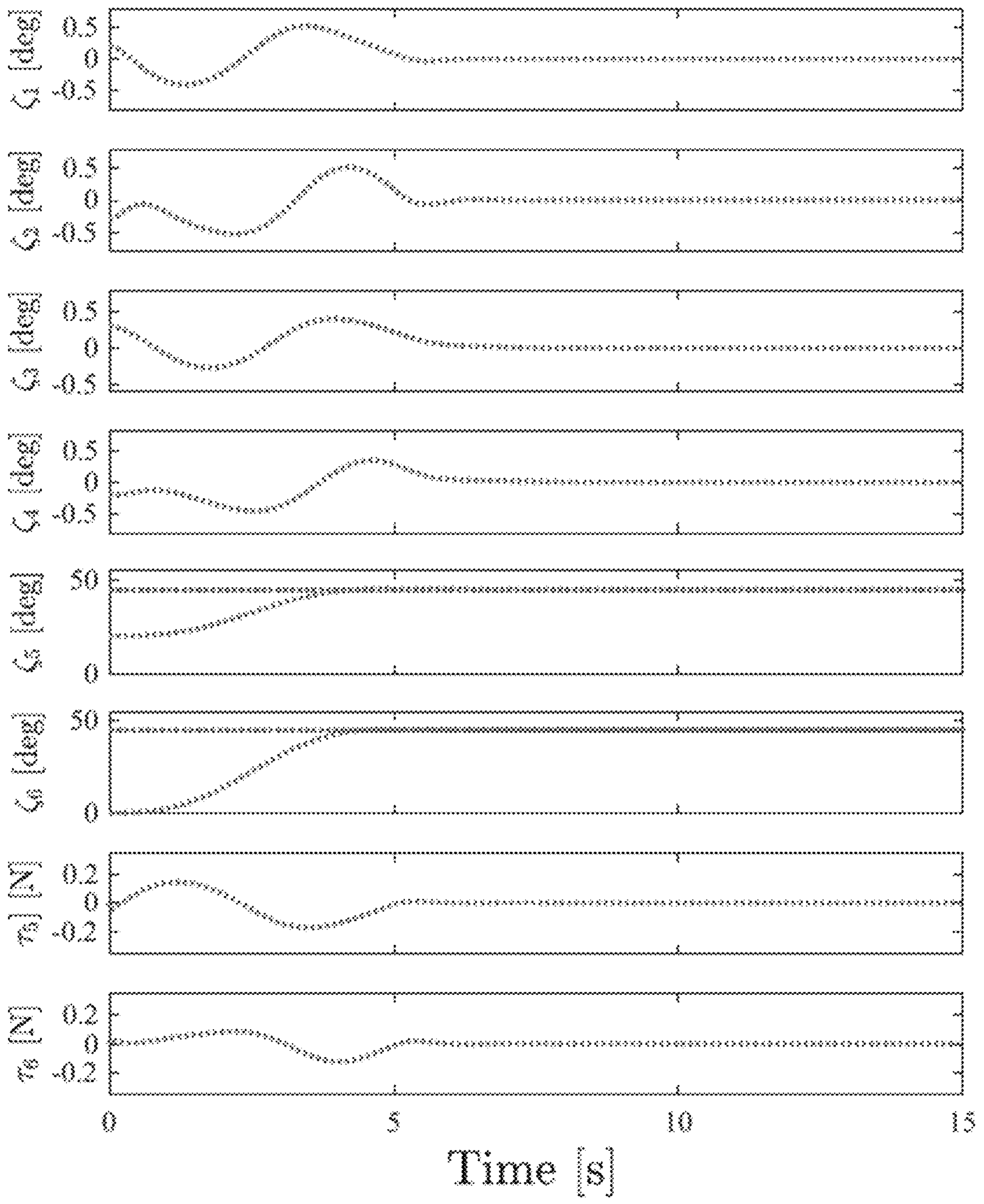
FIG. 3 is a simulation result diagram of an adaptive controller according to Embodiment 1 of the present disclosure.
Figure 4:
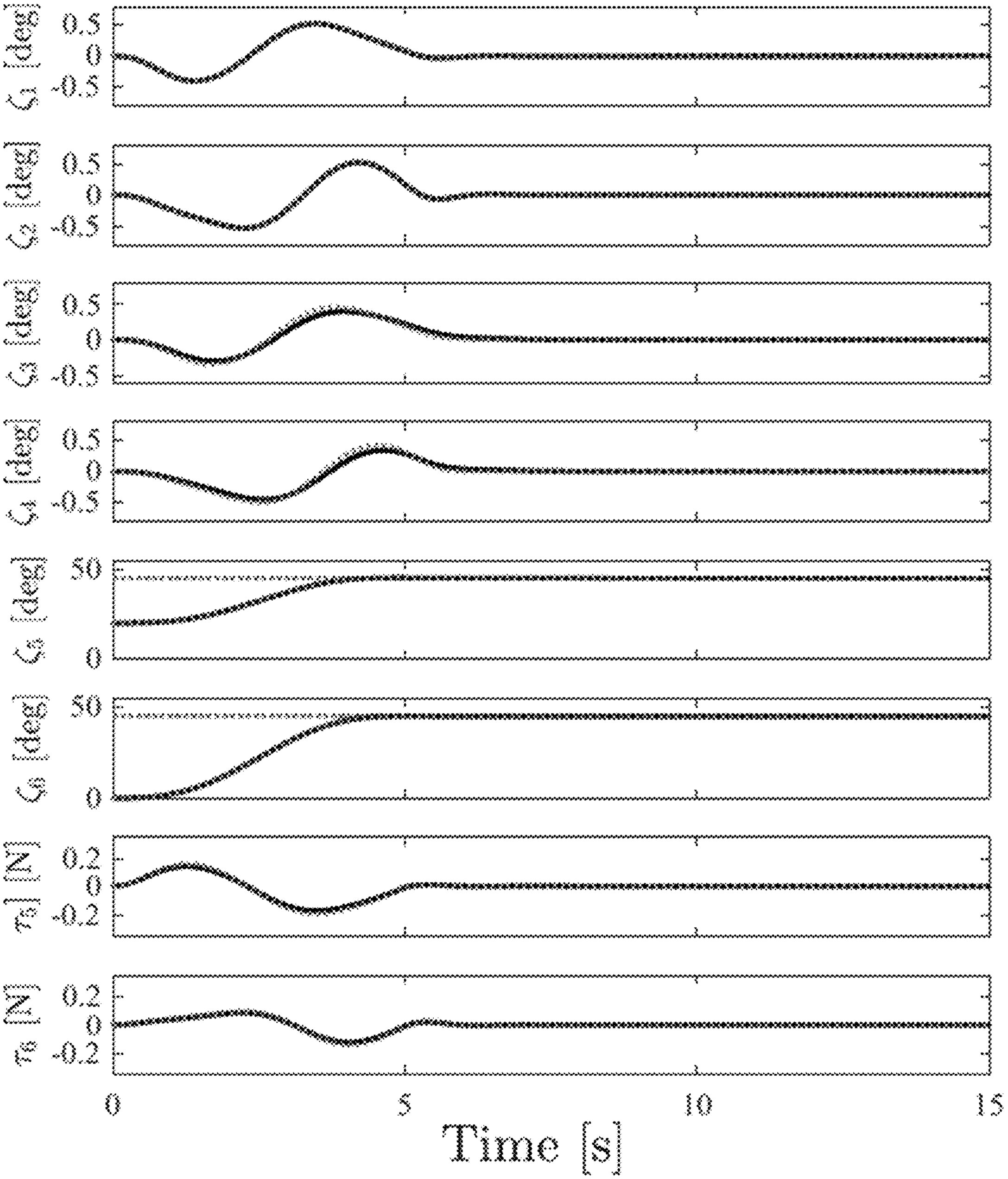
FIG. 4 is experimental result diagram of a proportional-integral-derivative (PID) controller of the adaptive control method for offshore cranes according to Embodiment 1 of the present disclosure.

Referring to FIG. 1, the present disclosure provides an adaptive control method for offshore cranes without requiring velocity feedback, including the following steps.

Parameters of an offshore crane system are obtained, and a three-dimensional dynamic model of the offshore crane system is constructed considering roll and pitch motions of a ship.

A total energy function based on the three-dimensional dynamic model of the offshore crane system is constructed, and an energy change is described according to a rate of change of a total energy of the offshore crane system.

Based on the three-dimensional dynamic model of the offshore crane system, auxiliary variables are constructed to replace a velocity signal of a state variable in a controller.

Based on an inverse trigonometric saturation function and the auxiliary variables, an adaptive controller without requiring velocity feedback is constructed.

The offshore crane system is controlled based on the adaptive controller to realize positioning and sway suppression of the offshore crane system.

The adaptive control method further includes the following steps.

(S1) The parameters of the offshore crane are obtained, and the three-dimensional dynamic model of the offshore crane system is constructed based on heave movement of the ship.

In this embodiment, the three-dimensional dynamic model of the offshore crane system is constructed based on a Lagrange modeling equation in combination with wind resistance and wave disturbances existing in practical applications.

The three-dimensional dynamic model of the offshore crane system is expressed as:

$$M(\zeta)\ddot{\zeta}+C(\zeta,\dot{\zeta})\dot{\zeta}+G(\zeta)=U-F;$$

$$M=\begin{bmatrix} m_{11} & m_{12} & m_{13} & m_{14} & m_{15} & m_{16} \\ m_{21} & m_{22} & m_{23} & m_{24} & m_{25} & m_{26} \\ m_{31} & m_{32} & m_{33} & m_{34} & m_{35} & m_{36} \\ m_{41} & m_{42} & m_{43} & m_{44} & m_{45} & m_{46} \\ m_{51} & m_{52} & m_{53} & m_{54} & m_{55} & m_{56} \\ m_{61} & m_{62} & m_{63} & m_{64} & m_{65} & m_{66} \end{bmatrix}$$

$$C=\begin{bmatrix} c_{11} & c_{12} & c_{13} & c_{14} & c_{15} & c_{16} \\ c_{21} & c_{22} & c_{23} & c_{24} & c_{25} & c_{26} \\ c_{31} & c_{32} & c_{33} & c_{34} & c_{35} & c_{36} \\ c_{41} & c_{42} & c_{43} & c_{44} & c_{45} & c_{46} \\ c_{51} & c_{52} & c_{53} & c_{54} & c_{55} & c_{56} \\ c_{61} & c_{62} & c_{63} & c_{64} & c_{65} & c_{66} \end{bmatrix}$$

$$G=[g_1\ \ g_2\ \ g_3\ \ g_4\ \ g_5\ \ g_6]^T;$$

$$U=[0\ \ 0\ \ 0\ \ 0\ \ \tau_5\ \ \tau_6]^T;\text{ and}$$

$$F=[F_1\ \ F_2\ \ F_3\ \ F_4\ \ F_5\ \ F_6]^T;$$

where $M(\zeta)$ represents a mass matrix; $C(\zeta, \dot{\zeta})$ represents a centripetal-Coriolis matrix; $G(\zeta)$ represents a gravity vector; U represents an input vector; F represents a wind resistance and friction vector; $\zeta$ represents the state variable; $\dot{\zeta}$ represents a velocity term of the state variable; and $\ddot{\zeta}$ represents an acceleration term of the state variable.

In an embodiment, internal elements of the matrix and vector above are expressed as:

$$m_{11} = (m_1 + m_2)l_1^2(1 + \zeta_1^2),\ m_{12} = (m_1 + m_2)l_1^2\zeta_1\zeta_2;$$

$$m_{13} = m_2 l_1 l_2(1 + \zeta_1\zeta_3),\ m_{l4} = m_2 l_1 l_2\zeta_1\zeta_4,\ m_{15} = (m_1 + m_2)l_1 L(C_5 - \zeta_1 S_5);$$

$$m_{16} = -\left((m_1 + m_2)l_1^2\zeta_2 + m_2 l_1 l_2\zeta_4\right),\ m_{21} = m_{12},\ m_{22} = (m_1 + m_2)l_1^2(1 + \zeta_2^2);$$

$$m_{23} = m_2 l_1 l_2\zeta_2\zeta_3,\ m_{24} = m_2 l_1 l_2(1 + \zeta_2\zeta_4),\ m_{25} = -(m_1 + m_2)l_1 L\zeta_2 S_5;$$

$$m_{26} = (m_1 + m_2)l_1^2\zeta_1 + (m_1 + m_2)l_1 L S_5 + m_2 l_1 l_2\zeta_3,\ m_{31} = m_{13},\ m_{32} = m_{23};$$

$$m_{33} = m_2 l_2^2(1 + \zeta_3^2),\ m_{34} = m_2 l_2^2\zeta_3\zeta_4,\ m_{35} = m_2 l_2 L(C_5 - \zeta_3 S_5);$$

$$m_{36} = -\left(m_2 l_2^2\zeta_4 + m_2 l_1 l_2\zeta_2\right),\ m_{41} = m_{14},\ m_{42} = m_{24},\ m_{43} = m_{34};$$

$$m_{44} = m_2 l_2^2(1 + \zeta_4^2),\ m_{45} = -m_2 l_2 L\zeta_4 S_5,\ m_{46} = m_2 l_2^2\zeta_3 + m_2 l_2 L S_5 + m_2 l_1 l_2\zeta_1;$$

$$m_{51} = m_{15},\ m_{52} = m_{25},\ m_{53} = m_{35},\ m_{54} = m_{45};$$

$$m_{55} = (m_1 + m_2)L^2 + l_y,\ m_{61} = m_{16},$$

$$m_{56} = -((m_1 + m_2)l_1 L\zeta_2 C_5 + m_2 l_2 L\zeta_4 C_5);$$

$$m_{62} = m_{26},\ m_{63} = m_{36},\ m_{64} = m_{46},\ m_{65} = m_{56};$$

$$m_{66} = (m_1 + m_2)L^2 S_5^2 + (m_1 + m_2)l_1^2(\zeta_1^2 + \zeta_2^2) + m_2 l_2^2(\zeta_3^2 + \zeta_4^2) + I_b + I_X S_5^2 + I_Z C_5^2 + 2(m_1 + m_2)l_1 L\zeta_1 S_5;$$

$$C_{11} = (m_1 + m_2)l_1^2\zeta_1\dot{\zeta}_1,\ C_{13} = m_2 l_1 l_2\zeta_1\dot{\zeta}_3;$$

$$C_{12} = (m_1 + m_2)l_1^2\dot{\zeta}_2 - 2(m_1 + m_2)l_1^2\dot{\zeta}_6,\ C_{14} = m_2 l_1 l_2\zeta_1\dot{\zeta}_4 - 2m_2 l_1 l_2\dot{\zeta}_6;$$

$$C_{15} = -(m_1 + m_2)l_1 L(S_5 + \zeta_1 C_5)\dot{\zeta}_5;$$

$$C_{16} = -\left((m_1 + m_2)l_1 L S_5 + (m_1 + m_2)l_1^2\zeta_1 + m_2 l_1 l_2\zeta_3\right);$$

$$C_{21} = (m_1 + m_2)l_1^2\zeta_2\dot{\zeta}_1 + 2(m_1 + m_2)l_1^2\dot{\zeta}_6,\ C_{22} = (m_1 + m_2)l_1^2\zeta_2\dot{\zeta}_2;$$

$$C_{24} = m_2 l_1 l_2\zeta_2\dot{\zeta}_4,\ C_{23} = m_2 l_1 l_2\zeta_2\dot{\zeta}_3 + 2m_2 l_1 l_2\dot{\zeta}_6,$$

$$C_{25} = (m_1 + m_2)l_1 L C_5(2\dot{\zeta}_6 - \zeta_2\dot{\zeta}_5),\ C_{26} = -\left((m_1 + m_2)l_1^2\zeta_2 + m_2 l_1 l_2\zeta_4\right)\dot{\zeta}_6,$$

$$C_{31} = m_2 l_1 l_2\zeta_3\dot{\zeta}_1,\ C_{32} = m_2 l_1 l_2\zeta_3\dot{\zeta}_2 - 2m_2 l_1 l_2\dot{\zeta}_6,\ C_{33} = m_2 l_2^2\zeta_3\dot{\zeta}_3,$$

$$C_{34} = m_2 l_2^2\zeta_3\zeta_4 - 2m_2 l_2^2\zeta_6,\ C_{35} = -m_2 l_2 L(S_5 + \zeta_3 C_5)\zeta_5,$$

$$C_{36} = -\left(m_2 l_2^2\zeta_3 + m_2 l_1 l_2\zeta_1 + m_2 l_2 L S_5\right),\ C_{41} = m_2 l_1 l_2\zeta_4\dot{\zeta}_1 + 2m_2 l_1 l_2\dot{\zeta}_6,$$

$$C_{42} = m_2 l_1 l_2\zeta_4\dot{\zeta}_2,\ C_{44} = m_2 l_2^2\zeta_4\dot{\zeta}_4,\ C_{43} = m_2 l_2^2\zeta_4\dot{\zeta}_3 + 2m_2 l_2^2\dot{\zeta}_6,$$

$$C_{45} = 2m_2 l_2 L\zeta_5\dot{\zeta}_6 - m_2 l_2 L\zeta_4 C_5\dot{\zeta}_5,\ C_{46} = -\left(m_2 l_1 l_2\zeta_2 + m_2 l_2^2\zeta_4\right)\dot{\zeta}_6,$$

$$C_{51} = -(m_1 + m_2)l_1 L S_5\dot{\zeta}_1,\ C_{52} = -(m_1 + m_2)l_1 L S_5\dot{\zeta}_2,\ C_{53} = -m_2 l_2 L S_5\dot{\zeta}_3,$$

$$C_{54} = -m_2 l_2 L S_5\dot{\zeta}_4,\ C_{55} = 0,\ C_{61} = 0,\ C_{62} = 0,\ C_{63} = 0,\ C_{64} = 0,$$

$$C_{65} = (m_1 + m_2)l_1 L\zeta_2 S_5\dot{\zeta}_5 + m_2 l_2 L\zeta_4 S_5\dot{\zeta}_5,$$

$$C_{56} = -\begin{pmatrix} 2(m_1 + m_2)l_1 I C_5\dot{\zeta}_2 + 2m_2 l_2 I C_5\dot{\zeta}_4 + \\ (m_1 + m_2)l_1 L\theta_1 C_5\dot{\zeta}_6 + \\ \frac{1}{2}\left((m_1 + m_2)L^2 + I_x - I_z\right)\ \sin(2\zeta_5)\dot{\zeta}_6 \end{pmatrix},$$

$$C_{66} = 2(m_1 + m_2)l_1^2(\zeta_1\dot{\zeta}_1 + \zeta_2\dot{\zeta}_2) + 2m_2 l_2^2(\zeta_3\dot{\zeta}_3 + \zeta_4\dot{\zeta}_4) + 2(m_1 + m_2)l_1 L\zeta_1 S_5 + 2m_2 l_2 L\zeta_3 S_5 + 2m_2 l_1 l_2(\dot{\zeta}_2\zeta_4 + \zeta_2\dot{\zeta}_4) + 2m_2 l_1 l_2(\dot{\zeta}_1\zeta_3 + \zeta_1\dot{\zeta}_3) + \left((m_1 + m_2)L^2 + I_x - I_z\right)\sin(2\zeta_5)\dot{\zeta}_5,$$

$$g_1 = (m_1 + m_2)l_1 g\zeta_1,\ g_2 = (m_1 + m_2)l_1 g\zeta_2,\ g_3 = m_2 l_2 g\zeta_3,\ g_4 = m_2 l_2 g\zeta_4;$$

$$g_5 = -gS_5\left(\frac{1}{2}M_0 L + (m_1 + m_2)L - \frac{1}{2}M_1 L_1\right),\ g_6 = 0;$$

where $M_0$ represents a weight of a ballast; $M_1$ represents a weight of the boom; $m_1$ represents a weight of a hook; $m_2$ represents a weight of the payload; L represents a length of the boom; $L_1$ represents a length of the ballast; $l_1$ represents a length of a hoisting rope; $l_2$ represents a distance between the hook and the payload; $I_x$, $I_y$, $I_z$ and $I_b$ are parameters related to moment of inertia; g represents a gravitational acceleration; $C_{(*)}$ represents cos (*); $S_{(*)}$ represents sin (*); $\tau_5$ represents a torque for driving the boom to rise and fall; $\tau_6$ represents a torque for driving the boom to rotate; $\zeta_1$, $\zeta_2$, $\zeta_3$ and $\zeta_4$ are swing angles of the hook and the payload; $\zeta_5$ represents an actual lifting angle of the boom; $\zeta_6$ represents an actual rotation angle of the boom; and $\zeta_i$(i=1 . . . 6) represents a corresponding angle in an inertial coordinate system.

It should be noted that the wind resistance of the offshore crane can be obtained through offline testing, and the wave disturbances are roll and pitch angles of the ship caused by ocean waves. In this embodiment, parameters of wind resistance and wave disturbances are obtained through simulation or analytical calculation.

(S2) The total energy function involving the kinetic and potential energy is constructed due to an energy of the offshore crane system involves the kinetic and potential energy. Then, the total energy function is differentiated to obtain the rate of change of the total energy. The total energy of the offshore crane system will change during a control process, and as long as the total energy of the offshore crane system maintains stable, it indicates that the offshore crane system is stable. Therefore, the rate of change of the total energy needs to be analyzed.

The total energy function of the offshore crane system is expressed as:

$$E = \frac{1}{2}\dot{\zeta}^T M(\zeta)\dot{\zeta} + (m_1 + m_2)l_1 g\left(1 - \cos\sqrt{\zeta_1^2 + \zeta_2^2}\right) + m_2 l_2 g\left(1 - \cos\sqrt{\zeta_3^2 + \zeta_4^2}\right);$$

and the total energy function is subjected to first derivation to obtain the following formulas:

$$\dot{E} = \dot{\zeta}^T\left(M(\zeta)\ddot{\zeta} + C(\zeta, \dot{\zeta})\dot{\zeta}\right) + (m_1 + m_2)l_1 g(\zeta_1\dot{\zeta}_1 + \zeta_2\dot{\zeta}_2) + m_2 l_2 g(\zeta_3\dot{\zeta}_3 + \zeta_4\dot{\zeta}_4);$$

$$\dot{E} = \dot{\zeta}^T(U - F - G) + (m_1 + m_2)l_1 g(\zeta_1\dot{\zeta}_1 + \zeta_2\dot{\zeta}_2) + m_2 l_2 g(\zeta_3\dot{\zeta}_3 + \zeta_4\dot{\zeta}_4);\text{ and}$$

$$\dot{E} = \dot{\zeta}_5\left(\tau_5 + gS_5\left(\frac{1}{2}M_0 L + (m_1 + m_2)L - \frac{1}{2}M_1 L_1\right) - w_{\zeta_5} C_5\right) + \dot{\zeta}_6(\tau_6 - w_{\zeta_6} C_5) - w_{\zeta_1}\dot{\zeta}_1^2 - w_{\zeta_2}\dot{\zeta}_2^2 - w_{\zeta_3}\dot{\zeta}_3^2 - w_{\zeta_4}\dot{\zeta}_4^2;$$

where $w_{\zeta_i}$(i=1 . . . 6) represents a coefficient of the wind resistance.

(S3) The auxiliary variables are expressed as:

$$\dot{\zeta}_5 = -k_{d5}(\varsigma_5 + k_{d5}e_5);\text{ and}$$

$$\dot{\zeta}_6 = -k_{d6}(\varsigma_6 + k_{d6}e_6);$$

where $e_5=\zeta_5-\zeta_{5d}$; $e_6=\zeta_6-\zeta_{6d}$; $\zeta_{5d}$ represents a target lifting angle of a boom in an inertial coordinate system; $\zeta_{6d}$ represents a target rotation angle of the boom; $\zeta_5$ represents the actual lifting angle of the boom; $\zeta_6$ represents the actual rotation angle of the boom; $k_{d5}$ and $k_{d6}$ are positive gain parameters; $\varsigma_5$ and $\varsigma_6$ are position values of the auxiliary variables; and $\dot{\zeta}_5$ and $\dot{\zeta}_6$ are velocity values of the auxiliary variables.

Based on the three-dimensional dynamic model of the offshore crane system, the kinetic and potential energy of the offshore crane system and the rate of change of the total energy are analyzed, and the auxiliary variables are designed.

(S4) The adaptive controller without requiring velocity feedback is constructed, expressed as:

$$\tau_5 = -k_{p5} \arctan(e_5) - k_{d5} \arctan(\varsigma_5 + k_{d5} e_5) + \delta_1^T \tilde{p}_1; \text{ and}$$

$$\tau_6 = -k_{p6} \arctan(e_6) - k_{d6} \arctan(\varsigma_6 + k_{d6} e_6) + \delta_2^T \tilde{p}_2;$$

where $k_{p5}$ and $k_{p6}$ are error-dependent control coefficients; $k_{d5}$ and $k_{d6}$ are error-derivative-dependent control coefficients;

$$\dot{\tilde{p}}_1^T = \dot{e}_5 \delta_1^T H_1^{-1};$$

$$\dot{\tilde{p}}_2^T = \dot{e}_6 \delta_2^T H_2^{-1};$$

$H_1$ and $H_2$ are positive diagonal matrices;

$$\delta_1^T = [S_5 \quad C_5];$$

$$\delta_2^T = [S_6 \quad C_6]; S_5$$

represents sin $\zeta_5$; $S_6$ represents sin $\zeta_6$; $C_5$ represents cos $\zeta_5$; $C_6$ represents cos $\zeta_6$; $\varsigma_5$ and $\varsigma_6$ are position values of the auxiliary variables; $\tau_5$ represents a torque for driving a lifting motion of the boom; and $\tau_6$ represents a torque for driving a rotation motion of the boom.

(S5) The offshore crane system is controlled based on the adaptive controller to realize the positioning and sway suppression of the offshore crane system.

In this embodiment, the controller effectively derives torque formulas of both a lifting motor and rotation, therefore, enabling direct application of torque control mode to the lifting motor.

In order to verify the effectiveness of the adaptive control method of the present disclosure, simulation experiments were conducted to verify its technical performance. Different system parameters were adopted to test the controller, and scientific comparative analyses of the results demonstrates the practical efficacy of the adaptive control method.

A proportional-integral-derivative (PID) controller and the adaptive control method were tested through a Simulink tool of MATrix LABoratory (MATLAB). Test results were shown in Table 1.

TABLE 1

Simulation comparison results

| Parameter group | Maximum positioning error $e_5$[deg] | Maximum positioning error $e_6$[deg] | Maximum sway suppression time [t] |
|---|---|---|---|
| Group 1 | 0.04 | 0.03 | 6.22 |
| Group 2 | 0.02 | 0.03 | 5.96 |

The simulation comparison results show that the adaptive control method maintains consistent control performance across different system parameter, effectively positioning the boom and enabling the hook and the payload to converge to their balance points after one cycle of swinging. It shows that the adaptive control method has good robustness.

The present disclosure constructs a three-dimensional offshore crane model considering roll and pitch motions of the ship, and designs the adaptive control method in view of the three-dimensional dynamic model. First, the present disclosure utilizes the Lagrange modeling equation to construct the offshore crane model, and constructs a Lyapunov energy function involving the kinetic and potential energy. Then, the present disclosure derives a form of the adaptive controller based on the first derivative of the energy function, and replaces the velocity information of the adaptive controller with designed auxiliary variables. The simulation results show that the designed controller can perform simultaneous positioning of the boom and the payload, and has good sway suppression of the payload.

Embodiment 2

In this embodiment, the present disclosure provides an adaptive control system for offshore cranes without requiring velocity feedback.

The adaptive control system includes a model construction module, an energy analysis module, an auxiliary variable construction module, a controller design module and an adaptive control module. The model construction module is configured to obtain the parameters of the offshore crane system, and construct the three-dimensional dynamic model of the offshore crane system considering roll and pitch motions of the ship. The energy analysis module is configured to construct the total energy function based on the three-dimensional dynamic model of the offshore crane system, and describe the energy change according to the rate of change of the total energy of the offshore crane system. The auxiliary variable construction module is configured to construct the auxiliary variables to replace the velocity signals of the state variables in the controller in combination with the three-dimensional dynamic model of the offshore crane system. The controller design module is configured to construct the adaptive controller without requiring velocity feedback based on the inverse trigonometric saturation function and the auxiliary variables. The adaptive control module is configured to control the offshore crane system based on the adaptive controller to realize positioning and sway suppression of the offshore crane system.

The modules above and corresponding steps have the same examples and application scenarios, and are not limited by the disclosure of any one of the embodiments. It should be noted that the modules above, as part of the offshore crane system, can be executed through a set of computer-executable instructions by a computer system.

The descriptions of the various embodiments emphasize different aspects. Sections that not detailed in a particular embodiment can be seen in other relevant embodiments.

The offshore crane system disclosed herein can be implemented in other manners. For example, the offshore crane system in the embodiment above is only illustrative. The modules above are only divided in logical function, and can be divided differently in practice. Multiple modules can be combined or integrated into another system, or some features can be omitted or not implemented.

Embodiment 3

In this embodiment, the present disclosure provides a computer-readable storage medium. The computer-readable storage medium is configured to store a computer program. The computer program is configured to be executed by a processor to implement the adaptive control method in Embodiment 1.

Embodiment 4

In this embodiment, the present disclosure provides a computer device. The computer device includes a memory, a processor and a computer program stored in the memory and configured to be executed on the processor. The processor is configured to execute the computer program to perform the adaptive control method in Embodiment 1.

Those skilled in the art should understand that embodiments of the present disclosure be provide as methods, systems, or computer program products. Therefore, the present disclosure can take the form of hardware embodiments, software embodiments, or a combination thereof. In addition, the present disclosure can be implemented in the form of a computer program product on one or more computer-available storage media (including but not limited to disk storage and optical storage, etc.) which contain computer-available program codes.

It can be understood by those skilled in the art that the implementation of all or part of the processes in the embodiments above can be completed by instructing the relevant hardware through the computer program. The computer program can be stored in the computer-readable storage medium, and is a case that the computer program is executed, it can include e the processes of the embodiments above. The computer-readable storage medium disks, optical discs, read-only memory (ROM), or random access memory (RAM).

Described above are specific embodiments of the present disclosure, which are not intended to limit the disclosure. It should be noted that various modifications and transformations made by those of ordinary skill in the art based on technical solutions of the present disclosure without departing the spirit of the present disclosure, shall fall within the scope of this application defined by the appended claims.

What is claimed is:

1. An adaptive control method for offshore cranes without requiring velocity feedback, comprising:

obtaining parameters of an offshore crane system, and constructing a three-dimensional dynamic model of the offshore crane system considering roll and pitch motions of a ship;

constructing a total energy function based on the three-dimensional dynamic model of the offshore crane system, and describing an energy change according to a rate of change of a total energy of the offshore crane system;

based on the three-dimensional dynamic model of the offshore crane system, constructing auxiliary variables to replace a velocity signal of a state variable in a controller;

based on an inverse trigonometric saturation function and the auxiliary variables, constructing an adaptive controller without requiring velocity feedback, expressed as:

$$\tau_5 = -k_{p5}\arctan(e_5) - k_{d5}\arctan(\varsigma_5 + k_{d5}e_5) + \delta_1^T\tilde{p}_1; \text{ and}$$

$$\tau_6 = -k_{p6}\arctan(e_6) - k_{d6}\arctan(\varsigma_6 + k_{d6}e_6) + \delta_2^T\tilde{p}_2;$$

wherein $e_5=\zeta_5-\zeta_{5d}$; $e_6=\zeta_6-\zeta_{6d}$; $\zeta_{5d}$ represents a target lifting angle of a boom in an inertial coordinate system; $\zeta_{6d}$ represents a target rotation angle of the boom; $\zeta_5$ represents an actual lifting angle of the boom; $\zeta_6$ represents an actual rotation angle of the boom; $k_{p5}$ and $k_{p6}$ are error-dependent control coefficients; $k_{d5}$ and $k_{d6}$ are error-derivative-dependent control coefficients;

$$\dot{\tilde{p}}_1^T = \dot{e}_5\delta_1^T H_1^{-1}; \dot{\tilde{p}}_2^T = \dot{e}_6\delta_2^T H_2^{-1};$$

$H_1$ and $H_2$ are positive diagonal matrices;

$$\delta_1^T = [\,S_5 \quad C_5\,]; \delta_2^T = [\,S_6 \quad C_6\,]; S_5$$

represents $\sin\zeta_5$; $S_6$ represents $\sin\zeta_6$; $C_5$ represents $\cos\zeta_5$; $C_6$ represents $\cos\zeta_6$; $\varsigma_5$ and $\varsigma_6$ are position values of the auxiliary variables; $\tau_5$ represents a torque for driving a lifting motion of the boom; and $\tau_6$ represents a torque for driving a rotation motion of the boom; and controlling the offshore crane system based on the adaptive controller to realize positioning and sway suppression of the offshore crane system.

2. The adaptive control method of claim 1, wherein the three-dimensional dynamic model of the offshore crane system is constructed based on a Lagrange modeling equation in combination with wind resistance and wave disturbances existing in practical application, expressed as:

$$M(\zeta)\ddot{\zeta} + C(\zeta, \dot{\zeta})\dot{\zeta} + G(\zeta) = U - F;$$

wherein $M(\zeta)$ represents a mass matrix; $C(\zeta, \dot{\zeta})$ represents a centripetal-Coriolis matrix; $G(\zeta)$ represents a gravity vector; U represents an input vector; F represents a wind resistance and friction vector; $\zeta$ represents the state variable; $\dot{\zeta}$ represents a velocity term of the state variable; and $\ddot{\zeta}$ represents an acceleration term of the state variable.

3. The adaptive control method of claim 1, wherein the step of constructing the total energy function based on the three-dimensional dynamic model of the offshore crane system, and describing the energy change according to the rate of change of the total energy of the offshore crane system comprises:

considering that the total energy of the offshore crane system comprises kinetic and potential energies, based on the three-dimensional dynamic model of the offshore crane system, constructing the total energy function involving the kinetic and potential energies; and differentiating the total energy function to obtain the rate of change of the total energy; and analyzing the rate of change of the total energy to describe the energy change of the offshore crane system;

wherein the total energy of the offshore crane system will change during a control process, and as long as the total energy of the offshore crane system maintains stable, it indicates that the offshore crane system is stable.

4. The adaptive control method of claim 3, wherein the total energy function is expressed as:

$$E = \frac{1}{2}\dot{\zeta}^T M(\zeta)\dot{\zeta} + (m_1 + m_2)l_1 g\left(1 - \cos\sqrt{\zeta_1^2 + \zeta_2^2}\right) + m_2 l_2 g\left(1 - \cos\sqrt{\zeta_3^2 + \zeta_4^2}\right);$$

wherein $M(\zeta)$ represents a mass matrix; $\zeta$ represents the state variable; $\dot{\zeta}$ represents a velocity term of the state variable; $\ddot{\zeta}$ represents an acceleration term of the state variable; $m_1$ represents a weight of a hook; $m_2$ represents a weight of a payload; $l_1$ represents a length of a hoisting rope; $l_2$ represents a distance between the hook and the payload; g represents a gravitational acceleration; $\zeta_1$ and $\zeta_2$ are swing angles of the hook; $\zeta_3$ and $\zeta_4$ are swing angles of the payload; and T represents transpose.

5. The adaptive control method of claim 1, wherein the auxiliary variables are expressed as:

$$\dot{\zeta}_5 = -k_{d5}(\varsigma_5 + k_{d5}e_5); \text{ and}$$

$$\dot{\zeta}_6 = -k_{d6}(\varsigma_6 + k_{d6}e_6);$$

wherein $e_5=\zeta_5-\zeta_{5d}$; $e_6=\zeta_6-\zeta_{6d}$; $\zeta_{5d}$ represents the target lifting angle of the boom in the inertial coordinate system; $\zeta_{6d}$ represents the target rotation angle of the boom; $\zeta_5$ represents the actual lifting angle of the boom; $\zeta_6$ represents the actual rotation angle of the boom; $k_{d5}$ and $k_{d6}$ are positive gain parameters; $\varsigma_5$ and $\varsigma_6$ are the position values of the auxiliary variables; and $\dot{\zeta}_5$ and $\dot{\zeta}_6$ are velocity values of the auxiliary variables.

6. The adaptive control method of claim 1, wherein a control expression of the adaptive controller comprises a torque expression of a lifting motor of the boom and a torque expression of a rotation motor of the boom; and the step of controlling the offshore crane system based on the adaptive controller to realize positioning and sway suppression of the offshore crane system comprises:

controlling the lifting motor in a torque control mode to realize positioning and sway suppression of the offshore crane system.

7. An adaptive control system for offshore cranes without requiring velocity feedback, comprising:

a model construction module;

an energy analysis module;

an auxiliary variable construction module;

a controller design module; and an adaptive control module;

wherein the model construction module is configured to obtain parameters of an offshore crane system, and construct a three-dimensional dynamic model of the offshore crane system considering roll and pitch motions of a ship;

the energy analysis module is configured to construct a total energy function based on the three-dimensional dynamic model of the offshore crane system, and describe an energy change according to a rate of change of the total energy of the offshore crane system;

the auxiliary variable construction module is configured to construct auxiliary variables to replace velocity signals of state variables in a controller in combination with the three-dimensional dynamic model of the offshore crane system;

the controller design module is configured to construct an adaptive controller without requiring velocity feedback based on an inverse trigonometric saturation function and the auxiliary variables, expressed as:

$$\tau_5 = -k_{p5}\arctan(e_5) - k_{d5}\arctan(\varsigma_5 + k_{d5}e_5) + \delta_1^T\tilde{p}_1; \text{ and}$$

$$\tau_6 = -k_{p6}\arctan(e_6) - k_{d6}\arctan(\varsigma_6 + k_{d6}e_6) + \delta_2^T\tilde{p}_2;$$

wherein $e_5=\zeta_5-\zeta_{5d}$; $e_6=\zeta_6-\zeta_{6d}$; $\zeta_{5d}$ represents a target lifting angle of a boom in an inertial coordinate system; $\zeta_{6d}$ represents a target rotation angle of the boom; $\zeta_5$ represents an actual lifting angle of the boom; $\zeta_6$ represents an actual rotation angle of the boom; $k_{p5}$ and $k_{p6}$ are error-dependent control coefficients; $k_{d5}$ and $k_{d6}$ are error-derivative-dependent control coefficients;

$$\dot{\tilde{p}}_1^T = \dot{e}_5\delta_1^T H_1^{-1}; \dot{\tilde{p}}_2^T = \dot{e}_6\delta_2^T H_2^{-1};$$

$H_1$ and $H_2$ are positive diagonal matrices;

$$\delta_1^T = [S_5 \quad C_5]; \delta_2^T = [S_6 \quad C_6];$$

represents sin $\zeta_5$; $S_6$ represents sin $\zeta_6$; $C_5$ represents cos $\zeta_5$; $C_6$ represents cos $\zeta_6$; $\varsigma_5$ and $\varsigma_6$ are position values of the auxiliary variables; $\tau_5$ represents a torque for driving a lifting motion of the boom; and $\tau_6$ represents a torque for driving a rotation motion of the boom; and the adaptive control module is configured to control the offshore crane system based on the adaptive controller to realize positioning and sway suppression of the offshore crane system.

8. A computer-readable storage medium, wherein the computer-readable storage medium is configured to store a computer program; and the computer program is configured to be executed by a processor to implement the adaptive control method of claim 1.

9. A computer device, comprising:

a memory;

a processor; and a computer program stored in the memory, and configured to be executed on the processor;

wherein the processor is configured to execute the computer program to perform the adaptive control method of claim 1.

* * * * *